(12) United States Patent
Zhu et al.

(10) Patent No.: US 7,127,461 B1
(45) Date of Patent: Oct. 24, 2006

(54) CONTROLLING ACCESS TO OBJECTS WITH RULES FOR A WORK MANAGEMENT ENVIRONMENT

(75) Inventors: Tao Zhu, Kirkland, WA (US); Chih Jenh Huang, Kirkland, WA (US); Dieter Zirkler, North Bend, WA (US)

(73) Assignee: Microsoft Corporation, Redmond, WA (US)

(*) Notice: Subject to any disclaimer, the term of this patent is extended or adjusted under 35 U.S.C. 154(b) by 458 days.

(21) Appl. No.: 10/306,871

(22) Filed: Nov. 27, 2002

(51) Int. Cl.
*G06G 17/30* (2006.01)

(52) U.S. Cl. ...................................... 707/9; 707/103 R

(58) Field of Classification Search .................. 707/9, 707/10, 100, 103, 103 R, 103 Y, 103 X, 103 Z
See application file for complete search history.

(56) References Cited

U.S. PATENT DOCUMENTS

| | | | |
|---|---|---|---|
| 5,539,906 A * | 7/1996 | Abraham et al. | 707/9 |
| 6,785,728 B1 * | 8/2004 | Schneider et al. | 709/229 |
| 2003/0200467 A1 * | 10/2003 | Choy et al. | 713/202 |

* cited by examiner

*Primary Examiner*—Leslie Wong
(74) *Attorney, Agent, or Firm*—Perkins Coie LLP

(57) ABSTRACT

A security system uses rules to restrict access to objects of a database. These security rules are dynamic because they can adjust when the number of objects in the database is changing. In other words, the security rules can permit access to new objects when new objects are added to, modified, or deleted from the database. With this system, objects can be added to a container by a security administrator or they can be added based upon the triggering or activation of one or more rules. With this system, access to objects in a database is usually determined after each request for access instead of relying on a static permanent list.

18 Claims, 7 Drawing Sheets

Access Control Tables

| Relationship Id | Group Id | Container Id |
|---|---|---|
| 500 | 20 | 1 |
| 505 | 100 | 2 |

| Relationship Id | Permission Id | Allow | Deny |
|---|---|---|---|
| 500 | 200 | 1 | 0 |
| 500 | 201 | 0 | 1 |

*FIG. 5*

Permission(s) Table

| Perm Id | Permission Name |
|---|---|
| 200 | Open Projects |
| 201 | Modify Projects |
| 202 | Modify Resources |
| 203 | Modify Assignments |

*FIG. 4*

Security Principle

Group(s) Name(s) Table

| Group Id | Group Name |
|---|---|
| 100 | Developers |
| 101 | Program Managers |

Group Member(s) Table

| Group Id | Member Id |
|---|---|
| 100 | 20 |
| 20 | 20 |
| 101 | 21 |
| 21 | 21 |

Individual User(s) Table

| Group Id | User Name |
|---|---|
| 20 | Bob |
| 21 | Joe |

*FIG. 6*

Work Management Object Table — 255

| Project Id | Project Name | Author |
|---|---|---|
| 4 | P4 | User 2 |
| 5 | P5 | User 3 |
| 6 | P6 | User 4 |
| 7 | P7 | User 5 |
| 8 | P8 | User 6 |
| 9 | P9 | User 7 |

| Assignment Id | Assignment Name | Author |
|---|---|---|
| 4 | A4 | User 22 |
| 5 | A5 | User 33 |

| Resource Id | Resource Name |
|---|---|
| 4 | A4 |
| 5 | A5 |

| Model Id | Model Name |
|---|---|
| 4 | A4 |
| 5 | A5 |

Security Rules Table — 250

| Rule Id | Object Type | Query |
|---|---|---|
| 10 | Project | Provide all projects authored by User 20 for this Container |
| 11 | Project | Always include projects 5 & 6 in this Container |
| 12 | Project | Include project 7 in this Container when budget exceeds X$ |
| 13 | Project | Do not permit program managers to have access to this project |

Container Object Table — 265

| Container Id | Object Type | Object Id |
|---|---|---|
| 1 | Project | 4 |
| 1 | Project | 5 |
| 1 | Project | 6 |
| 1 | Project | 7 |
| 2 | Project | 8 |
| 1 | Project | 9 |

Container Table — 245

| Container Id | Container Name | Description |
|---|---|---|
| 1 | User 20's Projects | All work projects assigned to User 20 |

Container Rules Table — 260

| Container Id | Rule Id | Object Type |
|---|---|---|
| 1 | 10 | Project |
| 1 | 11 | Project |
| 1 | 12 | Project |
| 1 | 13 | Project |

FIG. 7

CONTROLLING ACCESS TO OBJECTS WITH RULES FOR A WORK MANAGEMENT ENVIRONMENT

TECHNICAL FIELD

The present invention relates to accessing objects stored in a database and more specifically it relates to controlling access to objects that maybe stored in a database using rules combined with object containers.

BACKGROUND OF THE INVENTION

Conventional security for accessing objects in databases is usually dependent on the object of interest, meaning that permissions for a user are assigned to an object or a folder of objects. If a user is granted a different permission level for a particular action relating to an object, such as being able to modify a file in a file folder when previously the user had read only access for the file, then it is necessary to change the permission level associated with the object. In the aforementioned case, the object happens to be a file. But the object could also be file folder containing a group of files. Because of its dependency on individual objects, conventional security can be characterized as being "object-specific."

Several problems of the object-specific conventional security manifest themselves in the project management environment where user groups are assigned to a specific folder in a database to store and modify their files. For example, a western geographic region of users maybe required save their files in a "West" folder. Meanwhile, an eastern geographic region of users maybe required save their files in an "East" folder. In the same set of circumstances, the eastern geographic region of users maybe required to have access only to one-half of the contents of the "West" folder. Similarly, the western geographic region of users maybe required to have access only to one-half of the contents of the "East" folder.

With the object-specific conventional security, one way to resolve this problem is to create a duplicate set of the "West" files in which the eastern region employees have access and are stored in the "East" folder. And similarly, a duplicate set of the "East" files in which the western region employees have access can be created and stored in the "West" folder. These duplicate sets of files for each folder are necessary because in the object-specific conventional security model, security is linked or controlled by the folder. The object-specific conventional security model typically does not permit half access to files contained within a database folder. This Conventional security can be characterized as an "all" or "nothing" approach relative to access or permission level for a particular folder.

One problem with maintaining duplicate sets of files is that there could be some uncertainty as to how current the duplicate set of files is relative to the original set of files. Even an automated duplication system would have problems, especially if there are large volumes of files and constant edits being performed by different users on the original set of files. Another problem exists when a user wants to modify the "duplicate" of a file. It would be quite a challenge to have any changes made to a "duplicate" file to be reflective or later saved back into the original file from which the duplicate file was made.

Another way to solve this problem of accessing the same objects by different users of different user groups is to set the permissions directly on each of the required files in the "West" folder instead of setting permissions based upon a folder. Setting permissions based on individual files within a folder could permit eastern region employees to access the files stored in the "West" folder. Likewise, permissions could be set directly on each of the files in the "East" folder to permit western region employees to access the files stored in the "East" folder. But this solution can be quite troublesome because it would require the manual setting of individual permissions for each employee on each affected file.

In other words, another problem of the object-specific conventional security is that it is very difficult to customize permission or access settings for numerous individual users. For example, to customize permission or access settings for 1000 users who have access to 100+ files or file folders would require significant man power because each of the 100+ files or file folders would require custom or individualized settings.

Accordingly there is a need in the art for a security system permits individual customization for numerous users that reduces any work needed to make the customizations. There is also a need in the art for a security system that can permit different tiers of access to different groups of files within the same file folder. Another need exists in the art for a security system that does not require the duplication of files to permit access to information. A further need exists in the art for a security system that is dynamic and which can automatically respond to instantaneous changes to a database such as modifications to existing files or creation of new files. Another need exists in the art for a security system that can support users who can be members of various user groups, who in turn, may have various levels of access.

SUMMARY OF THE INVENTION

A security system can employ rules to monitor and restrict access to objects of a database. In this way, access to an object is not dependent upon one or more permission levels that are assigned to the object which is how access to objects is typically controlled in the conventional art. Instead, access to objects according to the present invention can be dependent upon security rules that are dynamic.

The security rules of the present invention are dynamic because they can adjust when the number of objects in the database is changing. In other words, the security rules can permit access to new objects when new objects are added to, modified, or deleted from the database. To make sure that new objects or any changes to objects are now accessible, a query of the database can be executed each time a user requests access to one or more objects.

Unlike the conventional art which employs static permission settings that are assigned to an object or a folder of objects, the security rules of the present invention can control access to objects based upon containers assigned to objects. The containers can be associated with one or more objects and are created based upon the rules. With the present invention, it is possible for a single object to be part of or "contained in" multiple containers. The containers can function similar to what one may refer to as a category having a specified label. Because of their dependency on rules and because their contents may change in view of this dependency upon the rules, the containers may be referred to dynamic object containers.

While one exemplary embodiment of the present invention has most or all of the objects stored in and accessed through the relational database, those skilled in the art will recognize that the objects within the dynamic object containers are not required to be stored in the relational database. The objects could be stored outside of the relational database. In other words, the objects subject to the security features of the present invention could comprise non-database type objects.

The security system can comprise a work management module that includes the security rules that permit access to objects that can be created or modified by the work management module. The work management module can run on a database server such as a relational database server. For example, the database can comprise a Standard Query Language (SQL) server which can be coupled to several different personal computers running stand alone versions of the work management module. The present invention is not limited to the work management module environment. The present invention could be designed for e-mail management, calendar management, word processors, spread sheets, document archive systems, and other like environments comprising information that is accessed by multiple users who may be assigned different permission or access settings.

Stored on the database server can be several sets of tables that are operatively linked to one another. A first set of tables can be referred to as a security principle and this set of tables may comprise an individual users table and a group members table. A second set of tables can be referred to as a security object and can comprise a container table, a container rules table, a container object table, a security rules table, and a work management object table. The work management object table can comprise the objects that are created or modified by the work management module. These objects are accessible to users via the security rules.

Another set of tables can be referred to as access control tables that can comprise a relationship Id/Group Id table and relationship Id/permission Id table. The relationship Id/permission Id table can comprise data representing whether a user can perform a specified action such as save or edit in relation to an object.

Another set of tables can be referred to as a permission table that can comprise data describing the action that can be taken with respect to an object and the permission Id associated with a particular action.

The security system can support several different types of queries relating to access of objects that can be created and modified by the work management module. One query can include requesting all objects that can be accessed by a particular user. Another query can include determining whether a user can access a particular object. These queries can be executed each time a user requests access to one or more objects operatively linked to a database.

One unique feature of the present invention is that a denied status controls or overrides any container where a user may have an allowed status. For example, a user may be a member of a first user group and a second user group. The first user group may have an allowed status with respect to accessing a particular object.

Meanwhile, the second group may have an access denied status with respect to accessing a particular object. For this exemplary scenario, if the user tries to access the particular object, she will be denied access since her access denied status for her membership with the second user group controls or overrides her access allowed status for her membership with the first user group.

Another unique feature of the present invention relative to the conventional art is that an event, instead of a security manager manipulating a permission or access level, could trigger or cause an object to become a member of a container that the object was previously not a member of. For example, if a first user changes a monetary amount in file, a rule tied to the monetary amount in this file could cause this file become part of a first container that is accessible by the second user. Prior to the change in the monetary amount, the file was not part of the first container. More specifically and by way of a simple example, if a first user exceeds a budget rule in a file, then this file could be made accessible to the second user who could be the supervisor of the first user.

And another feature of the present invention is that an object can belong to multiple containers where a different set of permissions or rules or both can be created for each respective container. This feature is beneficial when multiple user groups having various levels of permissions desire to access the same object. More specifically, this means that security rules can be used with a single container to define a different set of objects for each user. For example, a query by one user (or user group) can trigger different rules relative to another user (or user group). In an exemplary work management context, a security rule can return different projects for one user (or user group) versus another since they manage different projects and because the security rule can restrict access for one user relative to another.

This means that one container can be used to define access to projects for a group of users in an organization. Such a feature is not possible for conventional security systems without extensive planning. In conventional systems, those skilled in the art recognize that there are two main ways to control access to objects that are not as efficient of the containers and rules of the present invention: (a) a rather large container of objects can be established where many specific users are assigned to share the same level of access to these objects, and (b) instead of setting up a container of objects where the container has the permissions, permissions on each project can be established individually.

BRIEF DESCRIPTION OF THE DRAWINGS

FIG. 4 illustrates a more detailed view of an exemplary permission table according to one embodiment of the present invention.

FIG. 5 illustrates a more detailed view of exemplary access control tables that can form part of one embodiment of the present invention.

FIG. 6 illustrates a set of security principle tables according to one exemplary embodiment of the present invention.

FIG. 7 illustrates a set of security object tables according to one exemplary embodiment of the present invention.

DETAILED DESCRIPTION OF EXEMPLARY EMBODIMENTS

A security system according to the present invention uses rules to restrict access to objects of a database. These security rules can be characterized as dynamic because they can adjust when the number of objects in the database is changing. In other words, the security rules can permit access to new objects when new objects are added to, modified, or deleted from the database. With this system, objects can be added to a container by a security administrator or they can be added based upon the triggering or activation of one or more rules.

An Exemplary Operating Environment

Figure 1:
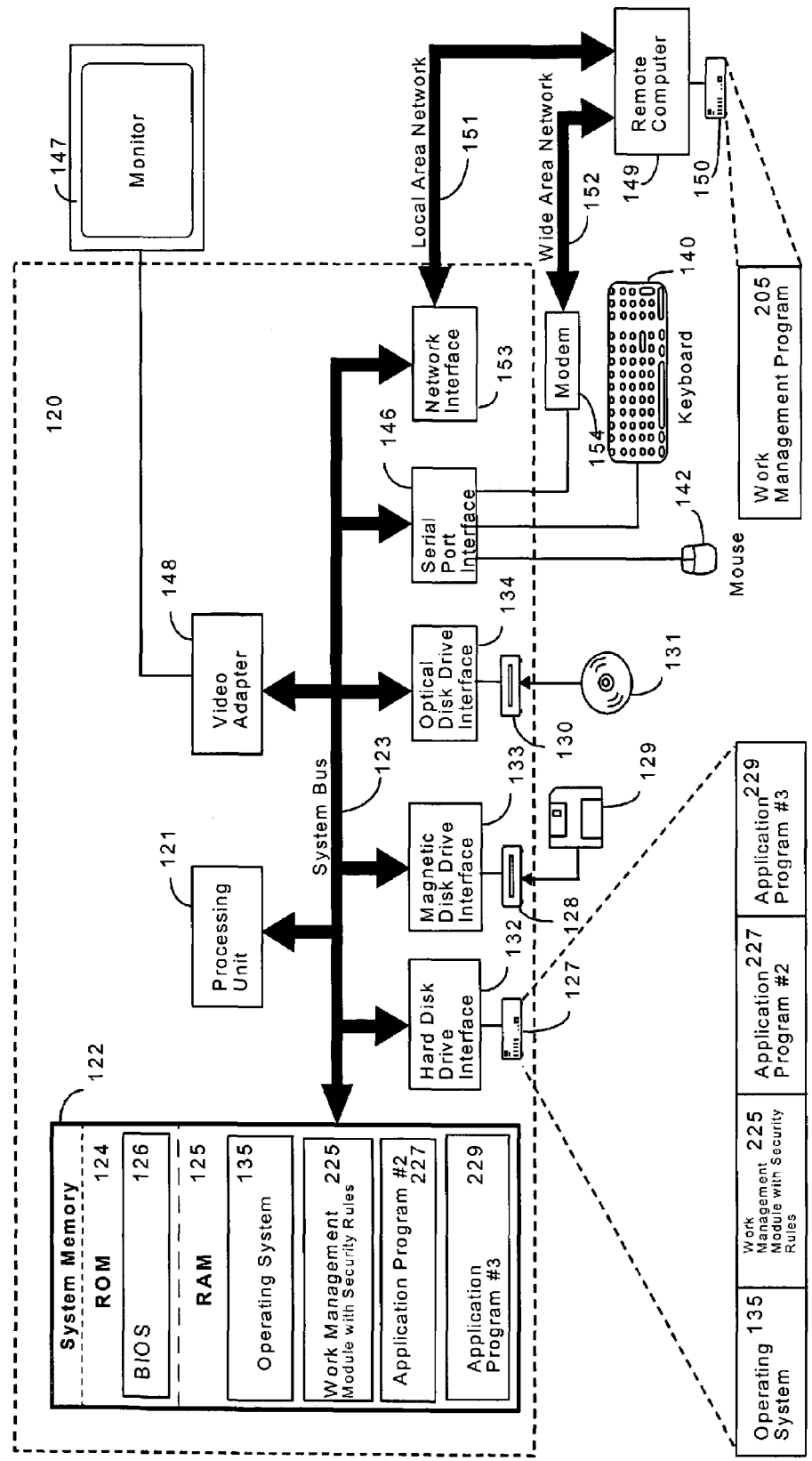
FIG. 1 illustrates an exemplary operating environment for the present invention according to one exemplary embodiment of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a work management module with security rules 225, a second application program module 227, and a third application program module 229. Program modules include routines, sub-routines, programs, objects, components, data structures, etc., which perform particular tasks or implement particular abstract data types. Aspects of the present invention may be implemented in the form of work management module with security rules 225.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 (running a work management program module 205 designed to interface with the work management module 225) may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
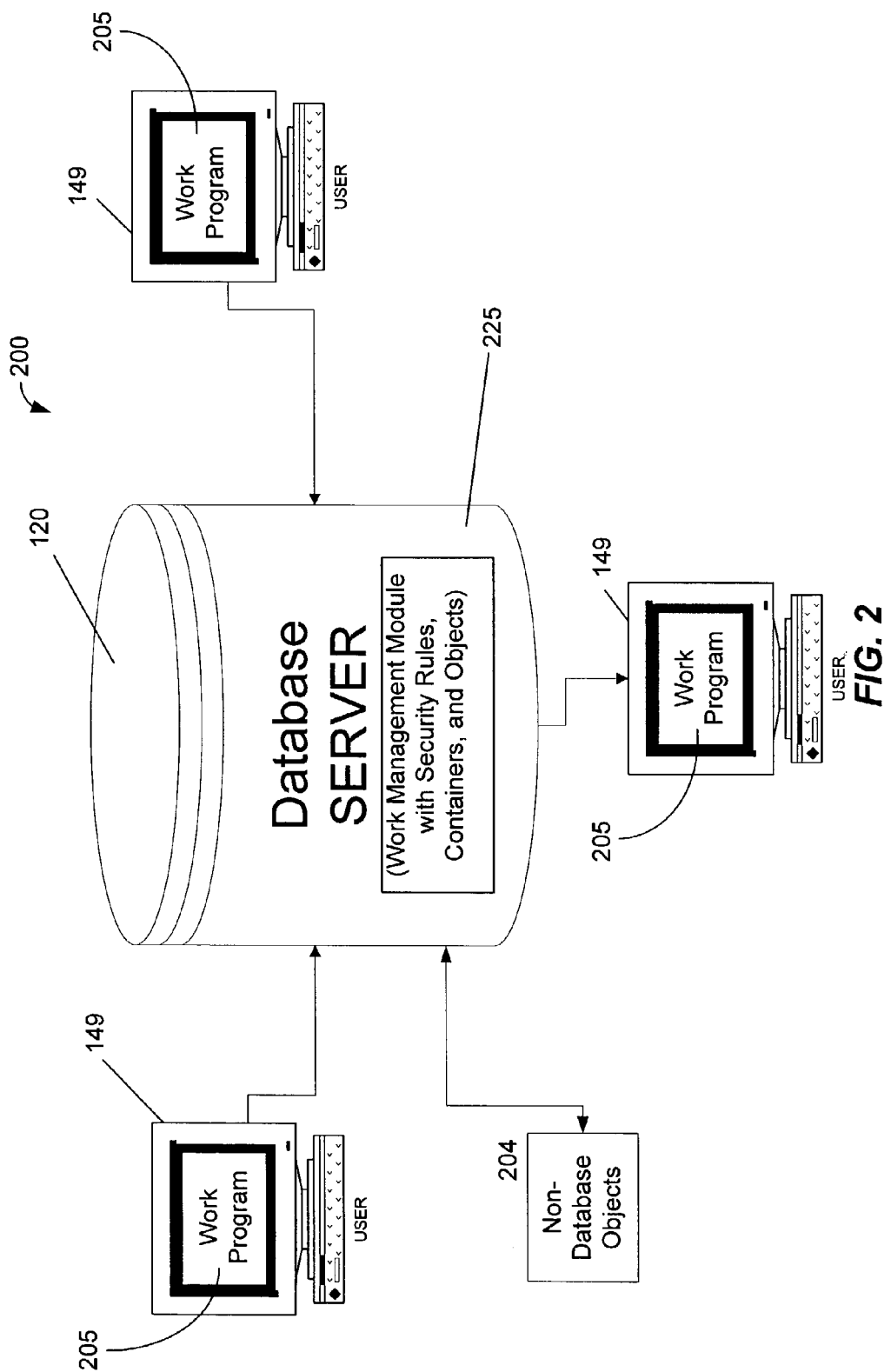
FIG. 2 illustrates an overview of an exemplary work management module with security rules running on a server that can be accessed by different users operating personal computers according to one exemplary embodiment of the present invention.

Referring now to FIG. 2, an exemplary architecture 200 is illustrated for supporting the security system of the present invention. The security system can comprise a work management module 225 that includes the security rules that permit access to objects that can be created or modified by the work management module. The objects can be located within the database server 120 or they can be objects 204 that reside outside of the database server 120 but are accessible by the server 120.

The work management module can run on a database server 120 such as a relational database server. For example the database server 120 can comprise a Standard Query Language (SQL) server which can be coupled to several different personal computers 149 running stand alone versions 205 of the work management module that interface with the main work management module 225.

As noted above, the present invention is not limited to the work management module environment. The present invention could be designed for e-mail management, calendar management, word processors, spread sheets, document archive systems, and other like environments comprising information that is accessed by multiple users who may be assigned different permission or access settings. According to one exemplary and preferred embodiment, the main work management module 225 can comprise Microsoft Project 2002.

The present invention includes multiple computer programs which embody the functions described herein and illustrated in the exemplary architecture diagrams and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary architecture and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Figure 3:
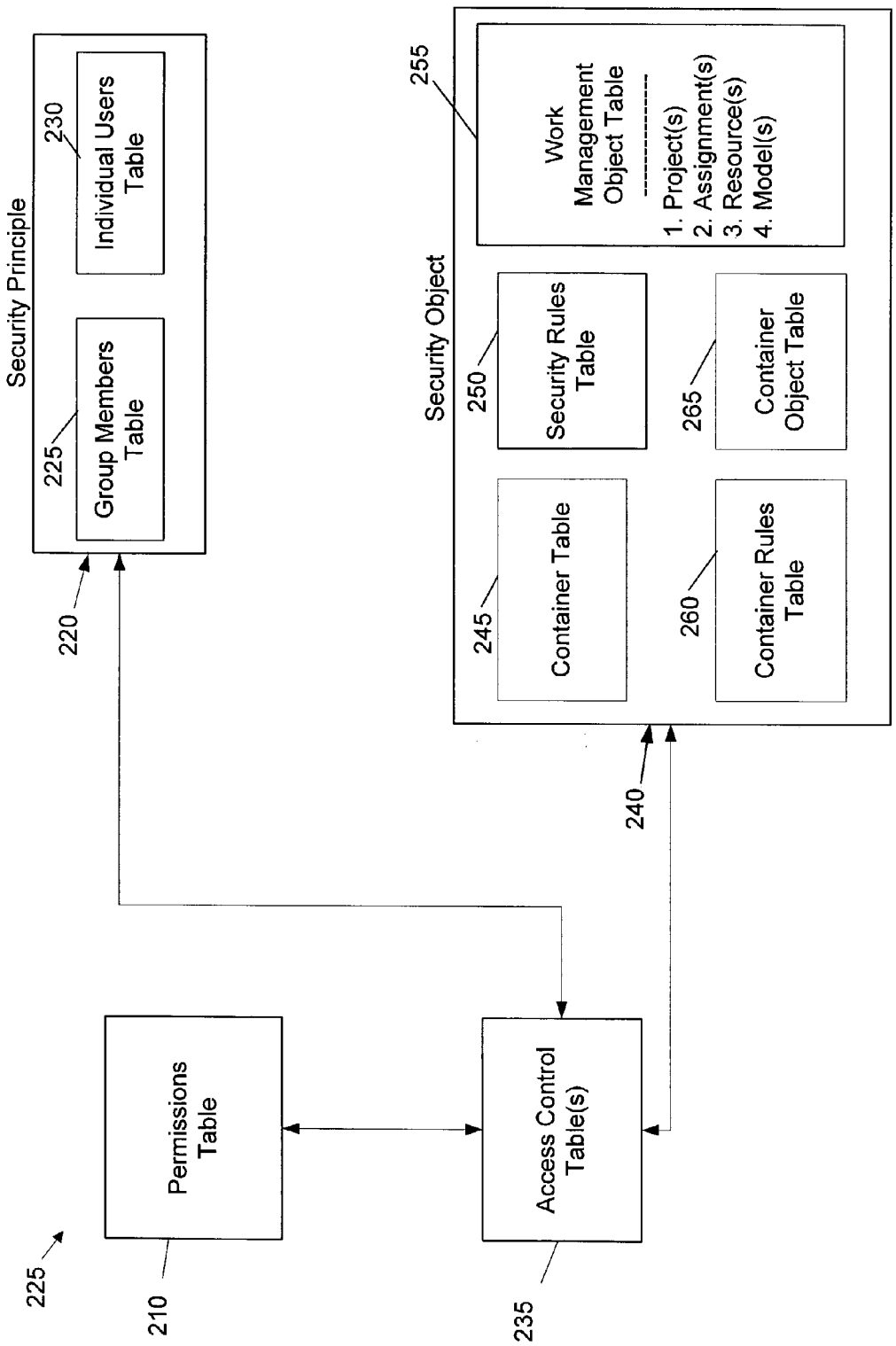
FIG. 3 illustrates an overview of several exemplary tables that can form one part of an exemplary embodiment of the present invention.

Referring now to FIG. 3, this figure illustrates an overview or high level view of several types of tables that can form part of the work management module 225. A first set of tables can be referred to as a security principle 220 and this set 220 of tables may comprise an individual users table 230 and a group members table 225. A security principle 220 comprises the users or groups of users who can access security objects. A second set of tables can be referred to as a security object 240 and can comprise a container table 245, a container rules table 260, a container object table 265, a security rules table 250, and a work management object table 255. A security object 240 can comprise the information that requires restricted or controlled access.

The work management object table 255 can comprise the objects that are created or modified by the work management module. Such objects can include projects, assignments, resources, and models. These objects are accessible to users via the security rules. As noted above the present invention is not limited to the work management environment. In other exemplary environments, such as in the e-mail management environment, the object table 255 could comprise e-mail folders with different names.

Another set of tables can be referred to as a permission table 210 and will be discussed with further detail below with respect to FIG. 4. The permission table 210 can comprise actions that can be performed by a security principle 220 on a security object 240. And another set of tables can be referred to as access control tables 235 and will be discussed with further detail below with respect to FIG. 5. The access control tables 235 can comprise a security principle's permissions for one or more security objects 240.

Data is accessed from each of the tables illustrated in FIG. 3 in order control access to information stored on the database server 120. Many of the tables in FIG. 3 have common data that permits cross referencing of information between the tables as represented by the bidirectional arrows illustrated in the drawing.

Referring now to FIG. 4, this figure illustrates an exemplary permission table 210 that can comprise associations between two types of data: (1) data describing the action that can be taken with respect to an object (listed under the column titled, "Permission Name") and (2) the permission Id associated with a particular action. In the exemplary permission table 210 illustrated, the permission Id 200 has action described as "Open Projects." The permission Id 201 has action described as "Modify Projects." The permission Id 202 has action described as "Modify Resources." And the permission Id 203 has action described as "Modify Assignments." The Permission Id information of the permission table is cross referenced with the data listed in the access control tables 235.

Referring now to FIG. 5, this figure illustrates exemplary access control tables 235 that can comprise two different subtables: (A) a relationship Id/group Id table and (B) relationship Id/permission Id table. The relationship Id/group Id table can comprise associations between three data types: (1) a relationship id; (2) a group id; and (3) a container id. This relationship Id of this relationship id/group id table can be used with the relationship Id/permission Id table. The relationship Id/permission Id table can comprise associations between four types of data: (1) relationship id, (2) permission id; (3) allow; and (4) deny. The allow and deny data representing whether a user can perform a specified action. For example, the allow and deny data could indicate if a user could perform a save or an edit in relation to an object.

As an example of the relationships between information presented by the access control tables 235 and permission tables 210, and specifically, the relationship Id/group id table, one can ascertain that group 20 users have an association with container one (1) objects and relationship Id of 500. Then it follows from the relationship Id/Permission id and the Permissions tables 210, that group 20 users can open projects (Relationship id 500, Permission id 200, Allow 1, Deny 0) but they cannot modify projects (Relationship id 500, Permission id 201, Allow 0, Deny 1).

Those skilled in the art will appreciate that the number and types of data listed in the tables discussed above and below is merely exemplary and that modifications by way of substitutions, additions, or deletions of data are not beyond the scope of the present invention. For example, those skilled in the art will appreciate that the "allow" and "deny" data columns could be combined into a single column of data. And this single column of data could use a number such as one (1) to indicate an "allow" status and a number such as zero (0) to represent a "deny" status, and a number such as two (2) to indicate neither "allow" nor "deny" status.

Referring now to FIG. 6, this figure illustrates a set of security principle tables 220 according to one exemplary embodiment of the present invention. The security principle tables 220 can comprise a group members table 225, an individual user(s) table 230, and a group names table. The group members table 225 can comprise associations between two types of data: (1) particular member identification numbers; and (2) group identification numbers. The individual user(s) table 230 can comprise associations between two types of data: (1) actual user names and (2) single group identification numbers.

According to one exemplary embodiment of the present invention, a user is considered to be a member of his or her own group, hence the column identifier "Group id" in the individual user(s) table 230. Because a single user's identification number is also considered a group comprising one person, then it follows that each user's identification number is also listed in the "Group Id" column of the group members table 225.

For example, the user "Bob" listed in the individual user(s) table has a group id of twenty (20). Bob's group id is also listed in the group member(s) table 225. The group member's table 225 also shows that Bob is a member of the Developers group since his member id of twenty (20) is associated with the group id one-hundred (100). The group member's table 225 further shows that Bob is a not a member of the Program Managers group since his member id of twenty (20) is not associated with the group id one-hundred-one (101). Meanwhile, the user "Joe" is a member of the Program Managers group. From the groups names table, it can be seen that the group id of one-hundred-one (101) has a group name of the "Program Managers." From the groups names table, it can also be seen that the group id of one-hundred (100) has a group name of the "Developers."

Referring now to FIG. 7, this figure illustrates a set of security object tables 240 according to one exemplary embodiment of the present invention. The security object tables 240 can comprise a container table 245, a security rules table 250, a work management object table 255, a container rules table 260, and a container object table 265. The container table can comprise associations between three types of data: (1) a container identification number, (2) a name of the container, and (3) a fuller description of a particular container.

For example, a container identification number of one (1) can have a container name of "User 20's projects," as illustrated in FIG. 7. The description associated with the identification number and container name could be "All work projects assigned to User 20" as illustrated.

Meanwhile, the security rules table 250 can comprise associations between three types of data: (1) a rule id, (2) an object type, and (3) a query or command listing the details of the rule. For example, for the rule identification number of ten (10), the object type comprises a "project" and the command comprises providing all projects authored by User 20.

The work management object table 255 can comprise subtables of different objects that can be accessed by a user. In the work management environment, these tables can comprise a project subtable, an assignment subtable, a resource subtable, and a model id subtable. The project subtable can comprise associations between three types of data: (1) a project identification number; (2) a project name; and (3) author(s). The assignment subtable can comprise associations between three types of data: (1) an assignment identification number; (2) an assignment name; and (3) author(s).

The resource subtable can comprise associations between two types of data: (1) a resource identification number; and (2) a resource name. And the model subtable can also comprise associations between two types of data: (1) a model identification number; and (2) a model name.

The container rules table 260 can comprise associations between three types of data: (1) a container identification number; (2) a rule identification number; and (3) an object type. The container object table 265 can comprise associations between three types of data: (1) a container identification number; (2) an object type; and (3) and an object identification number. The object identification number of this container object table 265 corresponds or is associated with the identification numbers of the work management object table 255. Specifically, the object identification number can correspond with the project identification numbers, the assignment identification numbers, the resource identification numbers, and the model identifications numbers listed in work management object table 255.

Exemplary Associations between Tables Illustrated in FIG. 7

As noted above, from the container table 245, a container identification number of one (1) can have a container name of "User 20's projects." The description associated with the identification number and container name could be "All work projects assigned to User 20." To create this container having all work projects assigned to User 20, one or more rules are needed. Referring now to the container rules table, one can observe container one (1) has three rules associated with it: rule identification number ten, rule identification number eleven, and identification number twelve. It is noted that a particular container identification number could be associated with more than one object type. But for the example illustrated in FIG. 7, container one is only associated with project object types and not assignment, resource, or model object types.

Referring to the security rules table 250, associated with rule identification number ten is the query or rule commanding that all projects authored by user 20 be included in the container associated with this rule. Associated with rule identification number 11 is the query or rule commanding that projects 5 and 6 always be included in the container associated with this rule. And associated with rule identification number twelve is the query or rule commanding that project 7 be included in container associated with this rule when the budget for this project exceeds a predetermined number of X dollars($).

Therefore, when objects of container one are desired to be displayed, the security rules are executed. The objects listed for container one will include at least projects having identification numbers four, five, and six. Project four will be listed because it falls within the requirements of rule id ten. Projects five and six will be listed because they fall within the requirements of rule id eleven. Project seven will be listed only when the budget for project seven exceeds X$ dollars as prescribed by rule id twelve. Project eight will never be listed since it has a container identification number of two.

Exemplary Associations between Tables of FIGS. 4–7

Building upon the exemplary associations discussed above with respect to FIG. 7, from the security principle tables of FIG. 6, one can ascertain that user 20 is Bob. From the access control tables 235 of FIG. 5, it can be ascertained that Bob has access to container one objects according to the relationship id/group id table. According to the relationship id/permission id table of the access control tables 235 and the permission table 210, it can be further ascertained that Bob can open projects (relationship id 500, permission id 200, allow 1, deny 0/permission id 200, permission name open projects) but Bob cannot modify any projects that he access (relationship id 500, permission id 201, allow 0, deny 1/permission id 201, permission name open projects).

Therefore, Bob can perform the following actions to the following objects (table values supporting these actions will be provided inside parentheses): Bob can open projects four, five, six (Container one objects, Rules ten and eleven, permission two-hundred, allow one, deny zero), but he cannot modify the contents of these files (Container one objects, Rules ten and eleven, permission two-hundred-one, allow zero, deny one). Bob can open project seven only when this project exceeds X dollars($) (Container one objects, Rule twelve, Permissions two-hundred, allow one, deny zero). And it follows that when Bob can open project seven, he cannot modify this file (Container one objects, Rule twelve, Permissions two-hundred-one, allow zero, deny one).

Exemplary Process Overview

Figure 8:
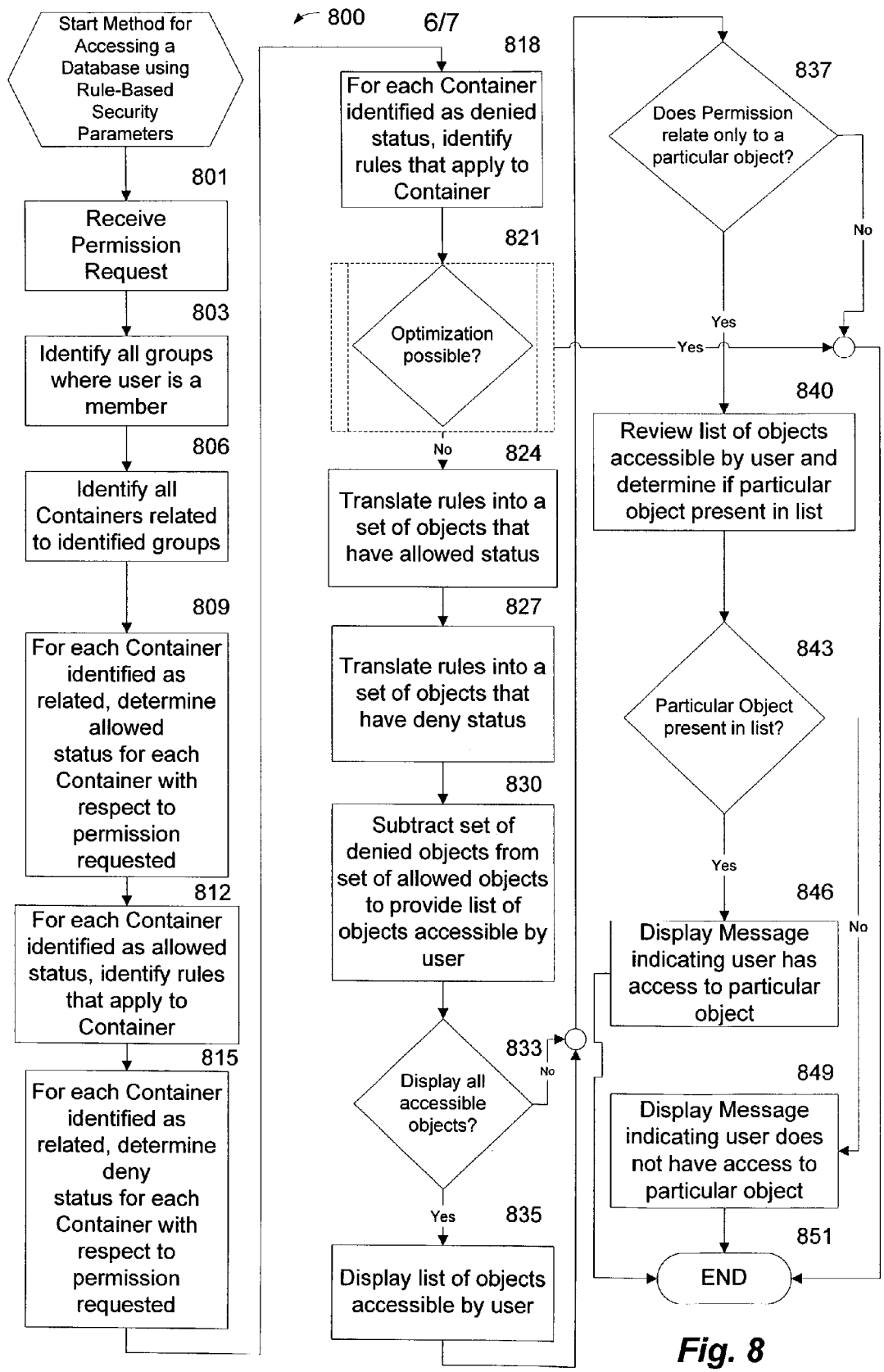
FIG. 8 illustrates an exemplary method for accessing a database using rule-based security parameters according to one exemplary embodiment of the present invention.

Referring now to FIG. 8, this figure illustrates a logic flow diagram of an overview of an exemplary process 800 for accessing a objects that can be stored on a database or outside a database using rule-based security parameters. It is noted that certain steps in the processes described below must naturally precede others for the present invention to function as described.

However, the present invention is not limited to the order of the steps described if such order or sequence does not alter the functionality of the present invention. That is, it is recognized that some steps may be performed before or after other steps or in parallel with other steps without departing from the scope and spirit of the present invention.

Step 801 is the first step of the exemplary process 800. In step 801, a permission request is received. For example, the permission request could originate from a user, such as Bob (who has a user/group id of twenty) and could comprise a request to open all projects in which he has access to in the database. In another exemplary embodiment, it is noted that the permission request could also comprise a request to perform an action with respect to a particular object instead of all objects. For example, the permission request could comprise a request to open a particular object such as a project.

Next in step 803, all groups in which a user is member are identified. As noted above, in one exemplary embodiment of the present invention, a single user identification number is considered a group comprising only one member. Therefore, a user, such as Bob discussed above could have an identification number of twenty. This identification number would also be considered as a group identification number that relates to a group comprising only single member, Bob (user identification number 20). It is further noted that Bob is a member of the developers group since Bob's user identification number of twenty is associated with group number one-hundred in the group member's table 225.

In step 806, all the containers are identified that are associated with the group number(s) uncovered in step 803. Continuing with the example of user "Bob", his group id of twenty is associated with container one objects according to the access control tables 235 illustrated in FIG. 5. Bob is also a member of the developers group having group id of one-hundred according to the group members table 225 illustrated in FIG. 6. According to the access control tables 235, the developers group (one-hundred) is associated with container two objects. For the current example, the access control tables 235 do not list the program managers (group id 101) nor any container objects associated with this group.

Next in step 809, for each container identified as related to the identified groups in step 806, it is determined whether a respective container has an allowed status relative to the permission that was requested. Since the exemplary tables illustrated in the Figures have been created to follow only container one objects, then only container one objects will be discussed for the remaining of the process flow. Those skilled in the art will appreciate that a group id of interest could have access to multiple containers.

As mentioned above, since Bob is a member of the developers group one-hundred, he also has access to container two objects. But since the Figures have been created to follow only container one objects completely and not container two objects, then container two objects with respect to Bob will not be discussed for the remainder of this detailed description. Therefore, in step 809, by reviewing the access control tables 235 illustrated in FIG. 5, it is determined that container one does have an allowed status with respect to a permission request comprising open projects.

In step 812, for each container identified in step 809 as having an allowed status, the rules associated with the allowed status containers are identified. And continuing with the example discussed above with respect to a permission request by Bob to open projects, by reviewing the container rules table 260 of FIG. 7, it is determined that there are four rules that apply to container one objects.

In step 815, similar to step 809, for each container identified as related to the identified groups in step 806, it is determined whether a respective container has a deny status relative to the permission that was requested. For the example permission request made by Bob to open all objects in which he has access, from the access control tables 235, it can be determined that he is not a member of a group that has any deny status for any containers of objects with respect to the permission request made.

Those skilled in the art will appreciate that Bob's group twenty does have a deny status for a permission request comprising modify projects, but that is not the permission request being studied in this detailed description (the detailed description is focused on the permission to open all objects in which user Bob has access). This concept of identifying deny status containers will become more important when any are found for a particular container and with respect to the requested permission as will be discussed in further detail below relative to step 830 where a subtraction event in connection with allowed and denied objects occurs.

In step 818, similar to step 812, for each container identified in step 809 as having an denied status, the rules associated with the denied status containers are identified. For the example permission request made by Bob to open all objects in which he has access, a denied status container was not identified in step 815 and this means that no rules are identified in this step 818.

Next, in optimization decision routine 821, it is determined if the process can be optimized at this point. Further details of the optimization decision routine 821 will be discussed below with respect to FIG. 9. If the inquiry to the optimization decision routine 821 is negative, then the "no" branch is followed to decision step 824. If the inquiry to the optimization decision routine 821 is positive, then the "yes" branch is followed to step 833.

In step 824, the rules uncovered in step 812 are translated into a set of objects that have an allowed status. For the example permission request made by Bob to open all objects in which he has access, by reviewing the container rules table 260, the security rules table 250 (and when the budget for project seven does not exceed X dollars), the container object table 265, and the work management object table 255, it is determined that Bob has access objects comprising projects four, five, six, and nine.

Bob has access to project nine because he does not meet the criteria of rule 13 of security rules table 250. Specifically, since Bob is not a member of the program managers group one hundred one (Bob is a member of the developers group one-hundred as illustrated in the group members table 225 of FIG. 6), then he is permitted access to project nine. It is noted that if Joe, who is a member of the developers group one-hundred-one had requested to see Bob's projects, then Joe would be denied access to project nine. Those skilled in the art recognize from this example that the number and types of rules are limitless and that they can be used to restrict access for individual users as well as groups. Further, the rules can be crafted to create object membership to a container based upon triggering events that can be connected to or relate to information contained within an object itself.

In step 827, the rules uncovered in step 815 are translated into a set of objects that have a denied status. For the example permission request made by Bob to open all objects in which he has access, there were no rules identified as having a denied status because there were no containers having a denied status. However, for those situations in which denied rules have been identified, the denied objects can be uncovered by reviewing the container rules table 260, the security rules table 250, the container object table 265, and the work management object table 255, similar to step 824.

Next in step 830, the set of denied objects uncovered in step 827 is subtracted from the set of allowed objects uncovered in step 824. The result of this subtraction event is a list of objects that are accessible by the user who made the permission request. For the example permission request made by Bob to open all objects in which he has access (and when the budget for project seven does not exceed X dollars), the result is objects comprising projects four, five, and six because the set of denied objects was the null set.

However, if any denied objects had been located for Bob, then the result would be less than the set of all the objects having an allowed status. The importance of step 830 cannot be over emphasized enough. Usually a set of denied objects is generated when a user belongs to a group that has denied status for the permission requested by the user. Step 830 makes the point that any denied status objects control or are dominate over any allowed status objects.

For example, as noted above, Bob is member group twenty and group 100, the developers. Suppose that the developers were restricted or excluded from opening Bob's projects. If this were the case, this would mean that step 827 would produce the identical objects produced in step 824. And step 830 would produce the null set. This particular scenario appears nonsensical since Bob is a member of the developers, and therefore, he would not have access to his own projects. But to resolve the situation, Bob would not want to be included in the developers group. This example only reinforces the concept above that the denied status objects are dominant or override any allowed status objects.

In decision step 833, it is determined whether the permission request comprises displaying all objects with respect to the permission request. If the inquiry to decision step 833 is positive, then the "yes" branch is followed to step 835 in which a list of objects accessible by the user is displayed. If the inquiry to decision step 835 is negative, then the "no" branch is followed to decision step 837.

In decision step 837, it is determined whether the permission request comprises determining whether a user has access to a particular object. If the inquiry to decision step 837 is positive, then the "yes" branch is followed to step 840 in which the list of objects accessible by the user is reviewed to determine if the particular object is present within the list of objects. If the inquiry to decision step 837 is negative, then the "no" branch is followed to step 851.

In decision step 843, it is determined whether the particular object is in the list of objects. If the inquiry to decision step 843 is positive, then the "yes" branch is followed to step 846 in which the a message indicating the user has access to the particular object is displayed. If the inquiry to decision step 843 is negative, then the "no" branch is followed to step 849 in which a message indicating the user does not have access to the particular object is displayed. In step 851, the process ends.

The exemplary process 800 of accessing objects stored on a database or outside a database using rule-based security parameters is usually executed or performed when ever a user desires to seek access to any objects in the database or coupled to the database. While those skilled in the art will appreciate that it is possible to save a list of objects in which a user has access instead of re-executing or performing the steps of process 800, those skilled in the art will also appreciate that large databases or volumes of related files can be changing at very small intervals such as minutes and even seconds. And therefore, a saved list would not always accurately reflect the current state of access for a particular user. Accordingly, in one exemplary and preferred embodiment of the invention, process 800 is executed every time a user desires to gain access or perform an action on some object in the database or coupled to the database. For example, every time a user wants to open objects in a database or save data with respect to an object in a database, process 800 will usually be executed.

Figure 9:
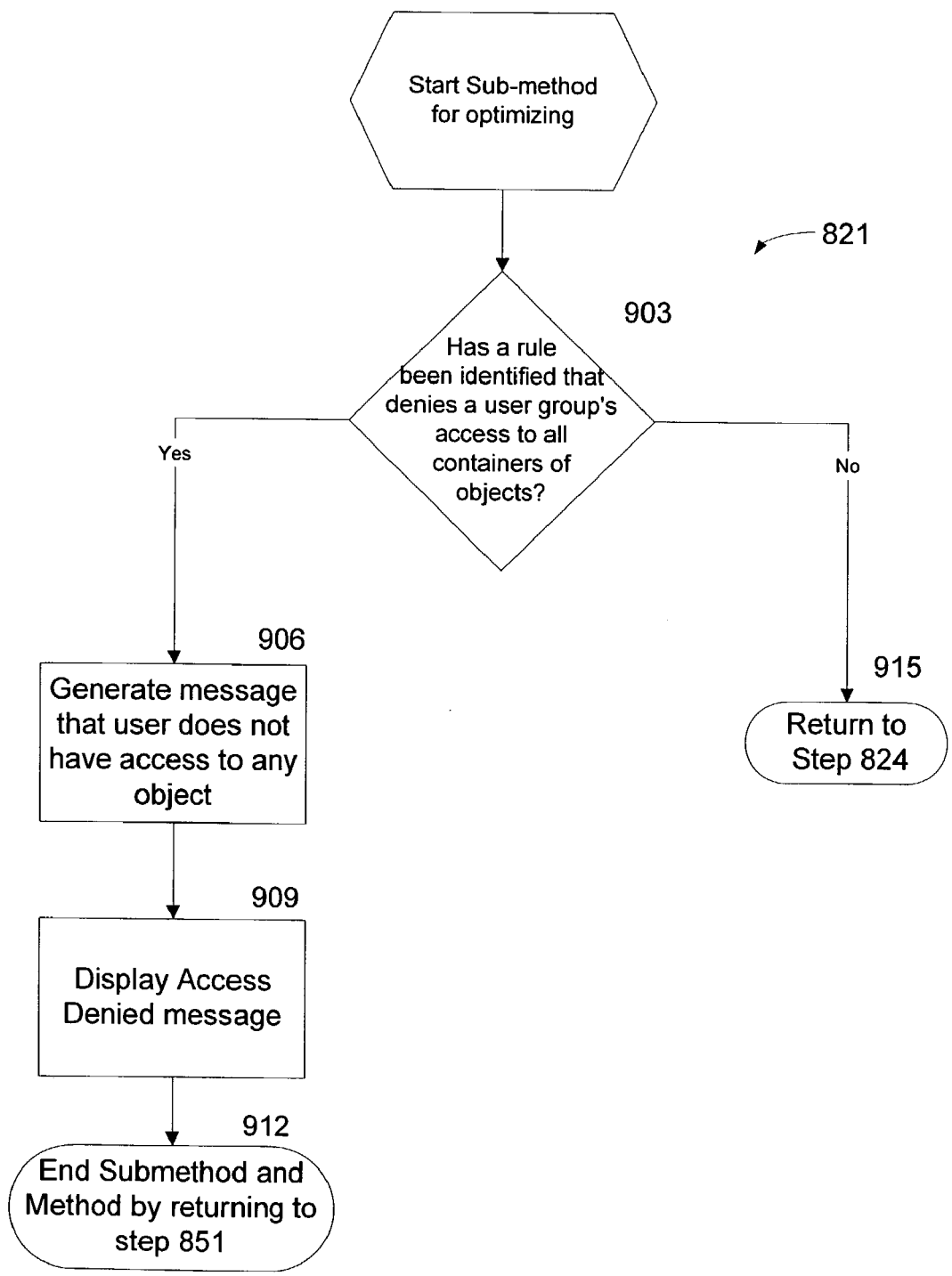
FIG. 9 illustrates an exemplary submethod for optimizing access control method of FIG. 8 according to one exemplary embodiment of the present invention.

Referring now to FIG. 9, this figure illustrates an exemplary submethod or routine 821 for optimizing the access control method 800 of FIG. 8. Decision step 903 is the first step of optimization decision routine 821. In decision step 903, it is determined whether a special rule has been identified that denies a user group's access to all containers of objects. Those skilled in the art will recognize that other special rules could be considered in this submethod without departing from the scope and spirit of the present invention.

If the inquiry to decision step 903 is positive, then the "yes" branch is followed to step 906 in which the a message indicating the user group does not have any access to an object is generated. If the inquiry to decision step 903 is negative, then the "no" branch is followed to step 915 in which the submethod ends and the process returns to step 824.

In step 909, the access denied message is displayed. And in step 912, the submethod and method ends by returning to step 851 in FIG. 8.

Alternative Environments/Applications

As mentioned above, one exemplary and preferred environment is in the work management context in which work is scheduled according to tasks, resources, assignments, etc. But those skilled in the art will appreciate that the present invention could be applied in other environments such as e-mail management databases, such as Microsoft Outlook, and other daily applications such as in spreadsheet programs or word processing programs.

It should be understood that the foregoing relates only to illustrative embodiments of the present invention, and that numerous changes may be made therein without departing from the spirit and scope of the invention as defined by the following claims.

What is claimed is:

1. A computer-implemented method for accessing objects using security rules, comprising:
   receiving from a user a request to perform an action with respect to an object;
   identifying groups to which the user is a member;
   identifying containers associated with the identified groups;
   from the containers identified as being associated with the identified groups,
      identifying the containers that allow the requested action, and, for each of the containers identified as allowing the requested action,
         identifying the security rules associated with each of these containers; and
         translating the identified security rules to identify a first set of objects that have an allowed status; and
      identifying the containers that deny the requested action, and, for each of the containers identified as denying the requested action,
         identifying the security rules associated with each of these containers; and
         translating the identified security rules to identify a second set of objects that have a deny status; and
   subtracting the second set of objects from the first set of objects to produce a resultant set of objects; and
   providing access to the object for the requested action if the object is contained in the resultant set of objects.

2. The method of claim 1, wherein the security rules are queries that dynamically identify objects based on relationships between the user and the objects.

3. The method of claim 1, wherein the object is a project contained in a database.

4. The method of claim 1, wherein the object is an email message.

5. The method of claim 1, wherein the object is an email folder.

6. The method of claim 1, wherein the object is a task.

7. The method of claim 1, wherein the object is an assignment.

8. A system comprising at least one central processing unit, the system for controlling access to objects using security rules, comprising:
   a component that receives from a user a request to perform an action with respect to an object;
   a component that identifies containers associated with the user;
   a component that, from the containers identified as being associated with the user,
      identifies the containers that allow the requested action, and, for each of the containers identified as allowing the requested action, translates security rules associated with the container identified as allowing the requested action to identify a first set of objects; and
      identifies the containers that deny the requested action, and, for each of the containers identified as denying the requested action, translates security rules associated with the container identified as denying the requested action to identify a second set of objects; and
   a component that subtracts the second set of objects from the first set of objects to produce a resultant set of objects; and
   a component that provides access to the object for the requested action if the object is contained in the resultant set of objects.

9. The system of claim 8, wherein the requested action is to access the object.

10. The system of claim 8, wherein the requested action is to open the object.

11. The system of claim 8, wherein the requested action is to modify the object.

12. The system of claim 8, wherein the requested action is to view the object.

13. The system of claim 8, wherein the requested action is to delete the object.

14. The system of claim 8, wherein the requested action is to save data with respect to the object.

15. The system of claim 8, wherein the object is in a database.

16. A computer-readable medium containing instructions for controlling a computer system to provide access to objects using security rules, by a method comprising:
   receiving from a user a request to perform an action with respect to an object;
   identifying containers associated with the user;
   for each of the identified containers that will allow the requested action, translating security rules associated with the container to identify a first set of objects; and
   for each of the identified containers that will deny the requested action, translating security rules associated with the container to identify a second set of objects; and
   subtracting the second set of objects from the first set of objects to produce a resultant set of objects; and
   providing access to the object for the requested action if the object is contained in the resultant set of objects.

17. The computer-readable medium of claim 16, wherein the identifying containers associated with the user comprises identifying all containers associated with the user.

18. The computer-readable medium of claim 16, wherein the security rules query for properties associated with objects.

* * * * *